United States Patent [19]

Ukai et al.

[11] 4,352,736
[45] Oct. 5, 1982

[54] WOUND FLATTENED HOLLOW FIBER ASSEMBLY HAVING PLURAL SPACED CORE SECTIONS

[75] Inventors: Tetsuo Ukai; Hiroshi Matsumoto; Chikara Kawamura, all of Otsu, Japan

[73] Assignee: Toyo Boseki Kabushiki Kaisha, Osaka, Japan

[21] Appl. No.: 214,569

[22] Filed: Dec. 8, 1980

[51] Int. Cl.³ .............................................. B01D 31/00
[52] U.S. Cl. ............................. 210/321.3; 210/323.2; 210/433.2; 210/497.1; 55/158
[58] Field of Search ...................... 210/257.2, 456, 321, 210/323.2, 433.2, 497.1; 55/158; 422/48

[56] References Cited

U.S. PATENT DOCUMENTS

| | | | |
|---|---|---|---|
| 3,422,008 | 1/1969 | McLain | 210/321.5 X |
| 3,455,460 | 7/1969 | Mahon et al. | 210/321.1 |
| 4,268,279 | 5/1981 | Shindo et al. | 210/321.3 X |

Primary Examiner—Benoit Castel
Assistant Examiner—David R. Sadowski
Attorney, Agent, or Firm—Birch, Stewart, Kolasch & Birch

[57] ABSTRACT

A hollow fiber assembly having a selective permeability including cylindrical arrangements of hollow fibers having selective permeability comprising mainly a cylindrical layer of hollow fibers formed by a crisscross arrangement of hollow fibers, a hollow portion which exists inside the above cylindrical layer of hollow fibers, a plurality of engaging members which are respectively separated from one another in said hollow portion, a resin wall (A) which is disposed at an open end of said hollow fibers and arranged to be open to the exterior without leaving any space between said fibers and with separation from said engaging means, a resin wall (B) which is disposed at the other end of said assembly for fixing the end of said assembly, an elastic supporting member for controlling the distance between the two resin walls (A) and (B), and a fluid supply conduit.

6 Claims, 8 Drawing Figures

WOUND FLATTENED HOLLOW FIBER ASSEMBLY HAVING PLURAL SPACED CORE SECTIONS

The present invention relates to a hollow fiber assembly having selective permeability. More particularly, it relates to a membrane separation apparatus made by assembling hollow fibers, of which wall membranes have selective permeability to a fluid.

The scope of application of a membrane separation apparatus includes gas separation, liquid permeation, dialysis, ultrafiltration, reverse osmosis, etc. Examples of its practical application are conversion of sea water into fresh water, desalting of brackish water, purification of waste water, refining of protein, condensing of fruit juice, separation of oil from water, blood dialysis, and so forth.

Hitherto, there have been many proposals for membrane separation apparatus utilizing hollow fibers having selective permeability. A typical structure is a hollow fiber assembly comprising a number of hollow fibers arranged in layers around a supporting core and contained in a cylindrical vessel. As the supporting core, there is usually employed a cylindrical tube provided on its tube wall a number of holes. Typical examples of such supporting core are shown in U.S. Pat. Nos. 3,526,001 and 3,755,034. These supporting cores have many small holes, and their structure is said to be suitable for uniformly dispersing a fluid supplied to the membrane separation apparatus, but in fact they have the following defects:

(1) A part of the hollow fiber layers which are in contact with the non-perforated portions of the supporting core forms a dead space, and the fluid to be treated stays at said portion. This causes insufficient contact with the fresh fluid to be treated, leading to lowering of the permeation flow rate and the separation efficiency of the apparatus. Also, in supplying a fluid from the supporting core to the hollow fiber layer, this dead space interrupts the uniform, radial flow of the fluid, and produces channeling of flow and concentration polarization, thus leading to drastic decreases in permeation performance and separation efficiency of the apparatus.

(2) In order to push out the fluid to be treated from the small holes of the supporting core by uniformly dispersing in the hollow fiber layer, a considerable pressure is required, so that the pressure loss in operation becomes large.

(3) The small holes in the supporting core are apt to be blocked by the slight amount of solid particles contained in the fluid to be treated. Once the holes have been plugged, the dead space is spread further to cause a larger loss of separation efficiency.

(4) In pushing out the fluid to be treated into the hollow fiber layer from the small holes of the supporting core under a high pressure, the hollow fiber layer expands under the flow resistance of the fluid, and the individual hollow fibers give rise to a tension. Such a tension acts upon the resin wall fixing the fiber with the result that the distance between the two resin walls of the assembly, i.e. the effective length of the hollow fiber assembly, is shortened. In this case, if the strength of piece of supporting core is small, the assembly per se shows a large shrinkage, which eventually causes a loss of separation performance. For example, when shrinkage occurs to the assembly, the hollow fiber layers are locally deformed to form coarse portions of hollow fiber layers. This may be the cause of the problems whereby the fluid to be treated is involved in channeling and concentration polarization. Alternatively, a large gap in distance is formed between the conduit for supplying the fluid to the supporting core of the assembly and the assembly, leading to a problem in operation such that the connection part between the conduit and the end plate is disconnected to prevent the fluid to be treated from running into the supporting core. In either case, the separation efficiency and the permeation performance of the hollow fiber assembly are remarkably lowered.

(5) On the other hand, in order to prevent a loss of efficiency of the apparatus attributed to the shrinkage of the assembly as in (4) above, a supporting core having high strength may be used. In such a case, the whole pressure in passing water acts upon the hollow fiber so that the hollow fiber is partially stretched under the flow resistance of the fluid, as a result thereof permanent stress partially remains, leading to a remarkable decrease in separation efficiency and permeation performance of the hollow fiber assembly.

(6) The portion near the open end of the hollow fiber is the position where the pressure of the fluid which permeates into the hollow fiber is the smallest. In the cases of ultrafiltration or reverse osmosis which causes permeation by the difference of pressures between the inside and the outside of the hollow fiber membrane, the portion nearest to this opening shows the largest amount of permeation, so that, should there arise any retaining of flow of the fluid to be treated, there would be a large effect of such retaining upon the separation performance of the apparatus. Therefore, in forming a tube sheet portion by impregnating with an adhesive agent having fluidity, if the adhesive agent plugs the small holes of the supporting core the outflow of the fluid to be treated is interrupted and the supply of the treating fluid runs short compared with the amount of permeation into the hollow fiber, thus providing a cause for such defects as drop of the separation efficiency or accumulation of the scale components.

It is therefore a main object of the present invention to provide, by improving the defects of the conventional hollow fiber assembly having the continuous supporting core, a hollow fiber assembly having a large permeation flow rate and a high separation efficiency with a good durability.

According to the present invention, there is provided a hollow fiber assembly having selective permeability comprising mainly cylindrical layers of hollow fiber layers formed by a crisscross arrangement of the hollow fibers, a hollow core portion which exists inside the above cylindrical layers of hollow fibers compressing a plurality of engaging members which are respectively separated from one another defining said hollow core portion, a resin wall (A) which is disposed at the open end of the hollow fibers and arranged to be open to the exterior without leaving any space between the fibers and with separation from said engaging means, a resin wall (B) which is disposed at the other end of the assembly for fixing the end of the assembly, an elastic supporting member for controlling the distance between the two resin walls (A) and (B), and a fluid supply conduit.

The hollow fiber assembly having selective permeability according to the present invention is illustrated in reference to the accompanying drawings, wherein.

Figure 1:
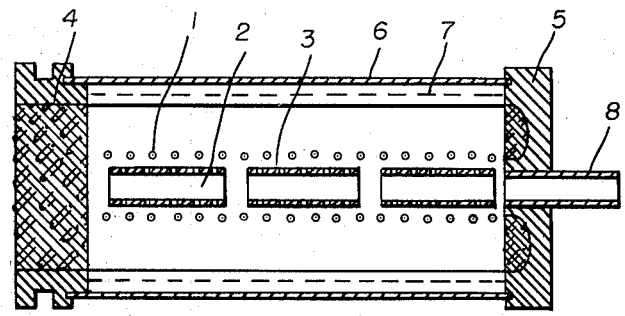
FIG. 1 is a vertical sectional view showing an embodiment of the assembly of the present invention.
Figure 8:
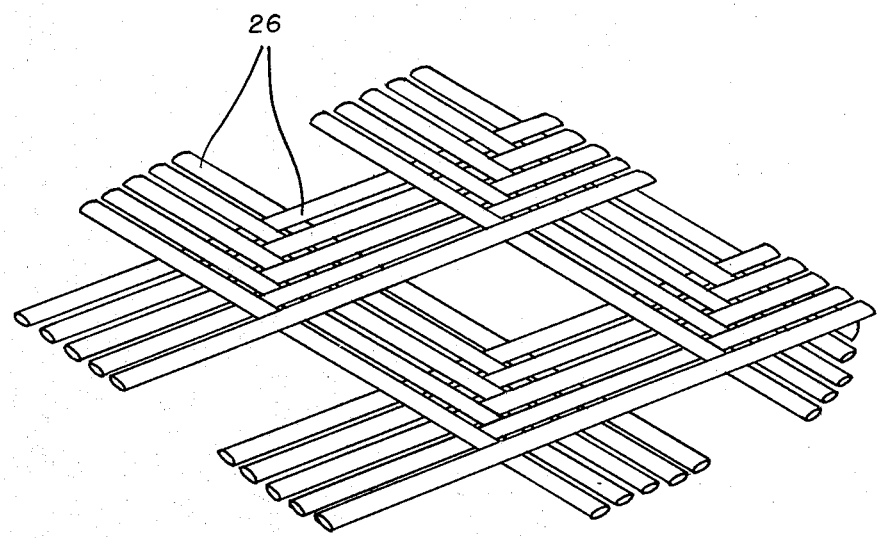
FIG. 8 is an enlarged illustrative view showing the crisscross arrangement in the cylindrical layer of hollow fibers.

In FIG. 1, the cylindrical hollow fiber layers 1 are arranged, as shown in FIG. 8, in multilayers of tape-like hollow fibers laid in crisscross form in a nearly parallel relationship to one another and in a flat form. The portion indicated as 2 is a hollow portion existing inside the cylindrical layers of hollow fiber arranged in crisscross form as stated above. The members indicated under 3 are the plural engaging members which are separated from one another. These engaging members are preferably arranged to be separated at a distance of 1 to 3 cm from one another. The member 4 is a resin wall (A), in which the hollow fibers are arranged in a manner to open to the exterior of the resin wall (A) in the closed adjacent condition to one another, and it is separated from the engaging members. Preferably, the distance thereof is 1 to 5 cm. The member 5 is a resin wall (B), in which the end of the cylindrical assembly is fixed, and through the central part of which a conduit 8 for fluid supply is thrusted.

The element 6 is an elastic supporting member for regulating the distance between the resin walls (A) and (B). The element 7 is a flow screen comprising net-like clothing having less fluid flow resistance covered on the outside of the hollow fiber layers.

Figure 2:
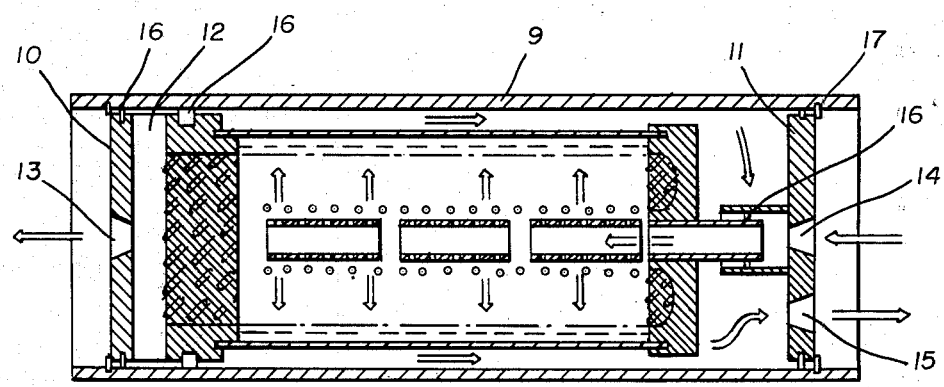
FIG. 2 is a vertical sectional view showing an example of the membrane separation apparatus equipped with the assembly shown in FIG. 1.

FIG. 2 is an embodiment of the membrane separation apparatus furnished with a hollow fiber assembly shown in FIG. 1, wherein the examples of flow of the fluid to be treated are indicated as arrow marks. In the Figure, the element 9 is a case for accommodating the assembly, at one end of which there is an end plate 10 which has an exit for the permeating fluid and at the other end of which there is an end plate 11 which has an inlet and an outlet for the fluid to be treated. The end plates 10 and 11 are supported with C-rings 17. The hollow fiber assembly, end plates and supply conduit are furnished with the O-rings 16 and are separated so that the supplied fluid, permeated fluid, and concentrated fluid are respectively prevented from being mixed with one another. Still, 12 is a pressure-sustaining, water collecting sheet, 13 is an outlet for the permeated fluid, 14 is an inlet for the fluid to be treated and 15 is an outlet for the concentrated fluid.

Figure 3:
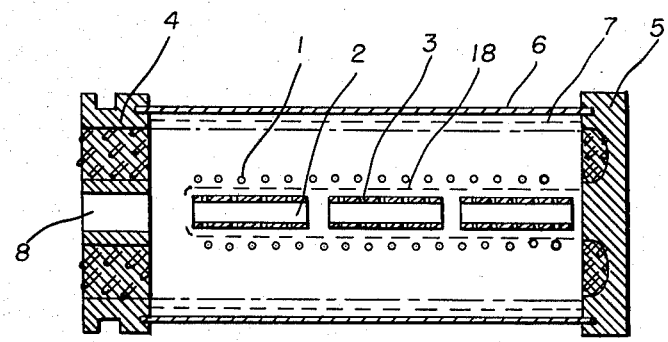
FIGS. 3 and 5 are vertical sectional view showing other embodiments of the assembly of the invention.

With regard to FIG. 3, the member 1 is a cylindrical layer of hollow fibers arranged in such a manner as shown in FIG. 8, 2 is a hollow portion existing in the inside of the cylindrical layer of the hollow fibers, 3 is a plurality of engaging members, on which there is fitted a protecting net 18 comprising a net-like clothing. The member 4 is a resin wall (A), in which the hollow fibers are arranged densely between said fibers and the resin wall (A) without leaving space. At the central part, there is a hole 8 communicated with the hollow portions 2, being separated from the engaging members 3. The part 5 is a resin wall (B) which fixes the end part of the cylindrical assembly. The member 6 is an elastic supporting member for controlling the distance between the resin walls (A) and (B), and 7 is a flow screen comprising a net-like clothing having a small flow resistance to fluid.

Figure 4:
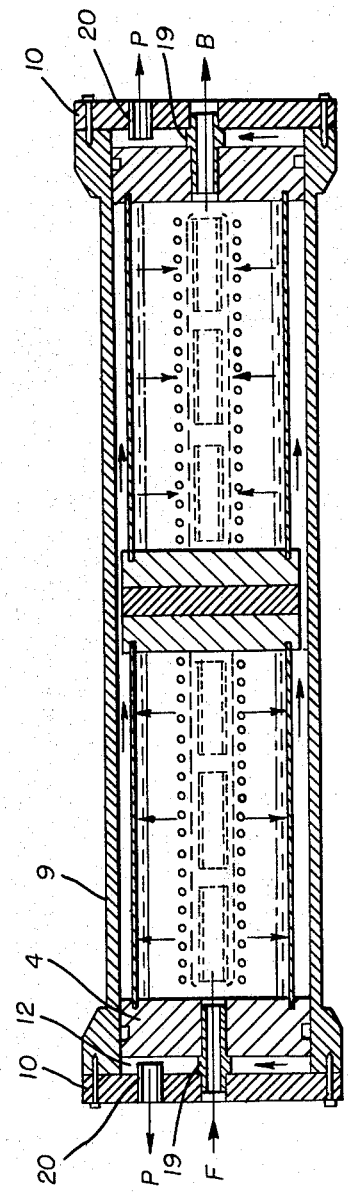
FIGS. 4, 6 and 7 are vertical sectional views showing respectively the examples of the membrane separation apparatus made by combining plural assemblies shown in FIGS. 3 and 5, respectively.

FIG. 4 is an example of a membrane separation apparatus furnished with the hollow fiber assembly shown in FIG. 2, wherein examples of the liquid flows are shown by the arrow marks. In the Figure, the member 9 is a vessel for accommodating two units of the above assembly. Into the central hole of the resin wall (A) 4 a supply connector 19 is set, and the pressure-sustaining, water collecting sheet 12 and the permeating water connector 20 are secured in the vessel with an end plate 10. These units of the same style are assembled in opposite arrangements on both sides, so that the fluid to be treated is supplied from the supply connector on one side and the concentrated fluid is taken out from the other connector. The fluid which permeated is taken out from the permeating water connectors on both side.

Figure 5:
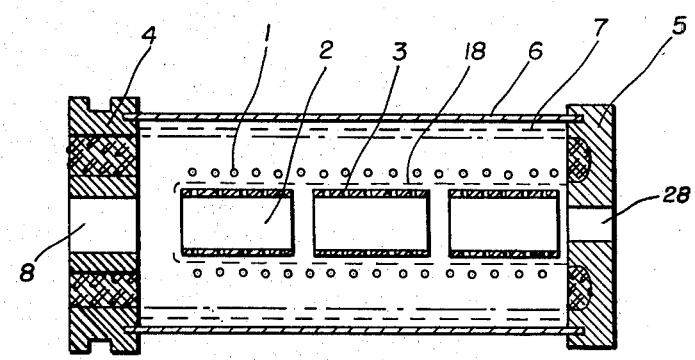

In FIG. 5, the member 1 is a cylindrical layer of hollow fibers, 2 is a hollow portion, 3 is an engaging member and 18 is a protecting net which covers the engaging members. The part 4 is a resin wall (A), which has at its central portion a supply conduit 8 communicated with the hollow portions. The resin wall (A) is so arranged that the hollow fibers are open to its outside. It is separated from the engaging means. Preferably the distance thereof is 1 to 5 cm from the standpoint of performance of separation. The element 5 is a resin wall (B), in which the end part of the tubular assembly is fixed, and a hole 12 is provided at the central part. The member 6 is an elastic supporting member for controlling the distance between the resin walls (A) and (B) and 7 is a flow screen.

Figure 6:
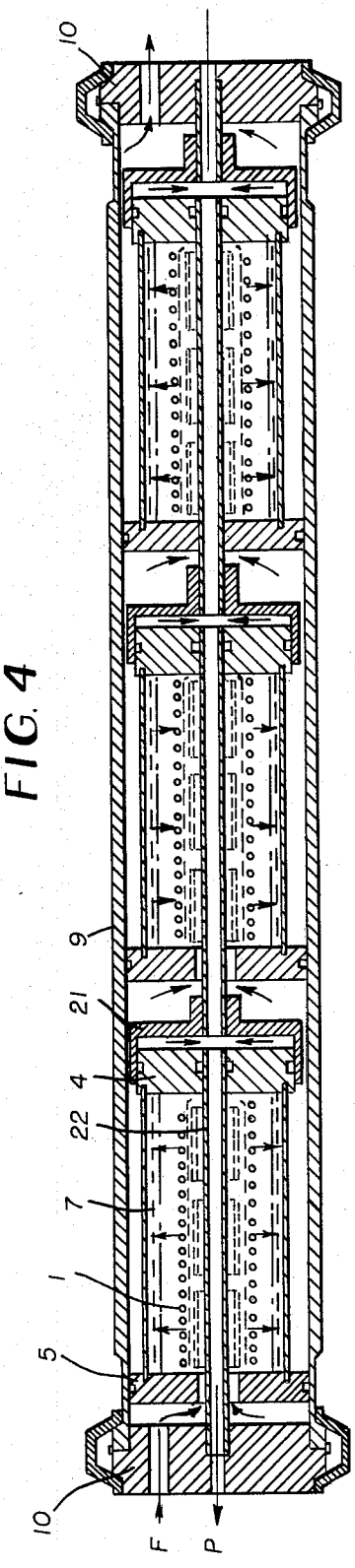

FIG. 6 is an example of the membrane separation apparatus furnished with a hollow fiber assembly of FIG. 5 wherein an example of the flow of the liquid to be treated is shown by the arrow marks. In the Figure, the element 9 is a vessel for accommodating three units of the above assembly. The permeating fluid led out from the resin wall (A) 4 is gathered to the permeating liquid collecting block 21, it runs from its center to the permeating water conduit 22 and is led to the end plate. The supplied fluid is introduced into the vessel 9 through the end plate 10, passes through the space between the hole provided at the center of the resin wall (B) 5 and the permeating water conduit 22 and is introduced into the hollow part of the hollow fiber assembly. Then, it is led through the hollow fiber layer 1 and the flow screen 7 to reach the inner wall of the vessel 9. Then, it passes through the space between the permeating liquid collecting block 21 and the container vessel to reach the resin wall (B) of the second hollow fiber assembly. Through the course similar to that described above the liquid passes through the second assembly, reaches the end plate 11 through the third assembly and then flows out as a concentrated liquid.

Figure 7:
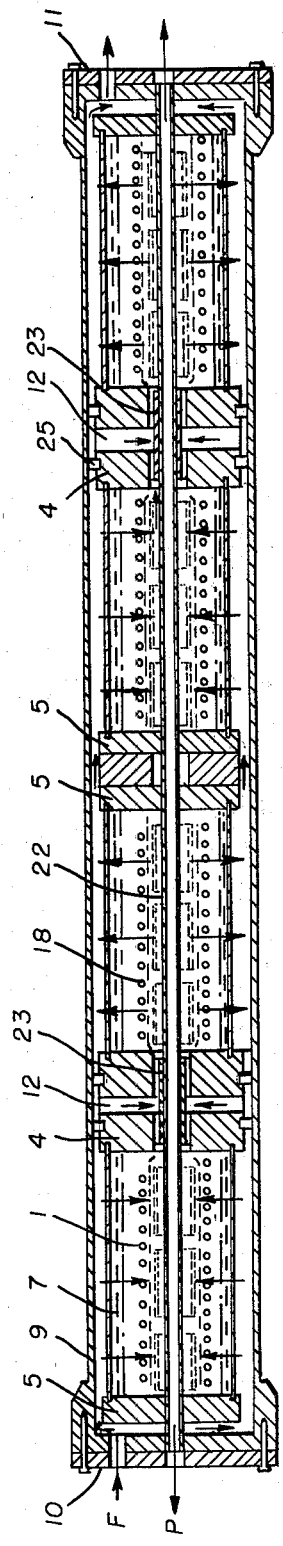

FIG. 7 shows an example of the membrane separation apparatus furnished with the hollow fiber assembly of FIG. 5, wherein examples of the flows of the fluid to be treated are shown by the arrow marks. In this Figure, the number 9 is a vessel to contain four sets of the above assembly. The permeating liquid which has been led through the open part of the hollow fiber of the resin wall (A) 4 passes through the pressure-sustaining water collecting sheet 12 to flow through the passage in the connecting tube 23 into the permeating water conduit 22, and then is led into the end plate. The permeating fluid led out from the second fiber assembly flows into the permeating water conduit 22 through the pressure-sustaining water collecting sheet 12 common to the first assembly and the connecting pipe 23 and is led to the end plate. The permeating fluid coming out from the third and fourth assemblies are also led to the end plate through the same route as the permeating fluid going out from the first and the second assemblies. The supplied fluid comes in from the end plate 10, led to the outer periphery of the first assembly, goes to the hollow portion through the flow screen 7 and the hollow fiber layer 1, and then is led to the hollow portion of the second assembly through the path in the connecting tube 23 provided at the center of the resin wall (A). The fluid which passed through the hollow fiber layer 1 of the second assembly passes through the space between the vessel 9 and the outer periphery of the resin wall (B) of the second assembly to reach the third assembly. The fluid is led through the third and the fourth assemblies via the same courses as in the above first and the second assemblies to the end plate 11 and flows outside as a concentrated fluid. 25 is the U packing.

In FIG. 8, the part 26 is a flat bundle of hollow fibers having selective permeability. Said fibers are of the tape form having the width in the range of 15 d to 50,000 d (wherein d shows an outer diameter of the hollow fiber), and the ratio of thickness to width being 1/20,000 to 1/5. The nearly parallel tapes are arranged without any space between one another. (In the drawing, they are described as having spaces one another so as to facilitate understanding). The layers produced by the nearly parallel tapes are arranged to intersect at the angles of 5° to 60°, and the two layers are disposed in intersection as upper and lower layers at the positions of intersection of the tapes.

The hollow fibers to be used in the present invention may not specifically be limited if they have the outer diameter of 10 to 10,000 microns and the hollow rate of 3 to 80%, and the membrane wall having a selective permeability to fluid. The membrane walls of these hollow fibers may be any of the microporous, anisotropic or composite forms of their combinations. Usually, the fiber comprises cellulose acetate and aromatic polyamide, and the like.

Preferably, the hollow fiber layers are wound to make a packing density of 45 to 70%. When the density is less than 45%, the flow velocity of the fluid becomes too low, and the fluid runs into the cylindrical layers of the hollow fibers at the inlet of the hollow portion (on the right side in FIG. 1), without reaching the deep inside part of the hollow portion, with the result that the separation efficiency of the assembly is lowered because of the failure of uniform running of the fluid in the hollow fiber layer. When the density exceeds 70%, the liquid does not run smoothly through the hollow fiber layer. In order to run forcibly, it is necessary to elevate the liquid supply pressure, and the apparatus shows a larger pressure loss and the hollow fiber layer is apt to be collapse. Preferably, the packing density is from 50 to 65%.

It is also desirable for the hollow fibers to be disposed in a crisscross relationship to one another at a winding angle of 5° to 60° to the axial direction of the hollow fiber layer. When the winding angle is too small, the hollow fiber layer is apt to collapse. To the contrary, when the winding angle becomes too large, the length of the hollow fiber wound on the core length becomes long, because of which the permeating water shows a large pressure loss and the amount of permeation decreases.

Further, preferably the diameter of the hollow portion at the central part of the hollow fiber assembly is usually from 1 to 10 cm, and the thickness of the hollow fiber layer is from 5 to 50 cm. When the diameter of the hollow portion is too small, the supply pressure of liquid must be made large. When it is too small, the liquid is not radially supplied to the whole lengthwise direction of the hollow fiber layer, and the hollow fiber layer is apt to collapse. If the thickness of the hollow fiber layer is too small, the permeation area of the hollow fiber becomes small and the fluid treating capacity decreases. If it is too large, the pressure loss is enlarged and channeling is apt to result.

In order to manufacture the above hollow fiber cylindrical layer, usually the engaging members are furnished on the shaft of a winding machine. If necessary, a protective net is covered thereon. Then, the hollow filaments are wound thereon uniformly at a moderate tension while traversing the filament, and thereafter, the shaft is removed to make the central part hollow. In this case, it is of course to be understood that the hollow portion includes the above engaging members and the protective net.

The engaging member to be used in the present invention is to support partially the hollow fiber layer facing the hollow portion which exists inside the cylindrical layer of the hollow fibers. As the engaging member, it is necessary to use the material having small resistance against fluid such as, for example, net-like material, ring form material, etc. Also, the engaging members show a function equivalent to that of the hollow portion which as a whole passes the fluid to the fiber layer, in the form of a but plurality and preferably more than 3 members provided mutually with spaces so that, when any change occurs to the distance between the resin walls (A) and (B), the differance shall not be concentrated to one spot. Further, the engaging member to be used in the present invention has a role of evenly dispersing the shrinking force under tension which acts upon the hollow fiber layer at the time of passing water, and an object of preventing beforehand the hollow fiber from being excessively expanded by the action of the flow resistance of fluid. The distance between the engaging members is preferably 1 to 3 cm.

The elastic supporting member to be used in the present invention has an object of performing the role of preventing excessive shrinkage of the hollow fiber assembly because of the adoption of the engaging members and absorbing the shock to be exerted to the hollow fibers when the fluid to be treated is abruptly supplied to the hollow fiber assembly. It is the means to render it possible to make moderate recovery from deformation by elasticity. Preferably, the elastic modulus of the elastic supporting members (E; kg/cm$^2$), the total sectional area of the elastic supporting members (S; cm$^2$) and the flow rate of the fluid to be supplied (Q; liter/min) are in the relationship of the formula:

$(E \times S/Q) \geq 40$

The material of which the elastic supporting member is made may be FRP (fiber glass reinforced plastics), stainless steel, etc. The number of the elastic supporting members is dependent upon the kind of the material, the size of the assembly, etc. and usually may be from 2 to 60.

Further, in the present invention, it is important to separate the engaging members and the resin wall (A). Preferably, the distance between them is 1 to 5 cm. By adopting the construction as above, it is possible to evade the bad effects caused by application of an adhesive agent to the supporting core as previously explained, i.e. loss of separation performance caused by retaining of the fluid to be treated.

The resin to constitute the resin wall (A) and the resin wall (B) of the present invention is preferably a liquid which has fluidity before curing and becomes a hard, solid form by curing. Representative examples of such resin are epoxy, polyester, silicon and polyurethane resins.

The flexible hollow fiber assembly according to the present invention has, due to the construction as above, scarce dead space for fluid in the hollow fiber layer and no obstacle such as the supporting core, so that it has the advantages as to produce extremely small pressure loss, permits quite even flow in the hollow fiber layer and provide very large separation efficiency. Moreover, in such an operation an to repeat intermittent operations and to run the liquid to be treated at a high flow rate, it does not show lowering or separation performance, and has excellent durability. There are also such characteristics that, even in the apparatus to be used by combining plural assemblies, the same action and the effect of the apparatus are obtainable as in the case of using the single assembly.

Practical and presently preferred embodiments of the present invention are illustratively shown in the following Examples.

EXAMPLE 1

On the shaft (20 mm in diameter) of a winding machine three net-like engaging members, each having an outer diameter of 27 mm and a length of 300 mm, were fitted at the distance of 30 mm one another. The surfaces of the engaging members were covered with a soft protective net. Around it there was wound a hollow fiber of cellulose acetate for reverse osmosis purpose having an outer diameter of 230 microns and an inner diameter of 110 microns while traversing from one end to the other end, with a packing density of 50%, at a winding angle of 8° to 30°, in a fixed number of winds to form a cylindrical layer of hollow fibers having an outer diameter of 118 mm and a length of 1260 mm, and its surface was covered with a flow screen. Thereafter only the shaft was removed to make a center hollow. Into the two ends of the thus formed hollow fiber layer, epoxy resin was injected to the positions distant by 20 mm from the positions of the engaging members, and the resin was cured to form the resin walls (A) and (B). Between the two resin walls (A) and (B), there were fitted three FRP elastic supporting members of 10 mm in width and 2 mm in thickness. The one resin wall (A) was cut perpendicularly to the axis of the hollow fiber layer to make the hollow fiber open externally thrusting through said resin wall, and a hollow fiber assembly was prepared. The end of the protective net was also separated by 20 mm from the resin wall (A).

The thus produced hollow fiber assembly was incorporated into the membrane separation apparatus shown in FIG. 2, into which 1500 ppm NaCl aqueous solution was supplied as a feed and circulated at a temperature of 25° C. under a pressure of 30 kg/cm² to carry out a reverse osmosis test. The results are as shown in Table 1.

Comparative Example 1

Instead of the hollow fiber assembly of Example 1, there was prepared a hollow fiber assembly with a structure that the hollow fiber layer had at its center a supporting core provided with a number of small holes, said core being embedded in the resin wall. Said hollow fiber assembly was incorporated in the membrane separation apparatus as shown in FIG. 2, with which a reverse osmosis test was carried out under the same conditions as in Example 1. The results are as shown in Table 1.

The supporting core had a diameter of 27 mm and a length of 1 m. The small holes on the core, having a diameter of 1.7 mm, were provided 70 in number. The winding density of the hollow fiber layer and the winding angle were the same as those shown in Example 1.

TABLE 1

|  | Example 1 | Comparative Example 1 |
|---|---|---|
| Supply flow rate (liter/day) | 22000 | 19100 |
| Permeation flow rate (liter/day) | 16500 | 14300 |
| Pressure drop between inlet and outlet (kg/cm²) | 0.1 | 1.2 |
| Water recovery*¹ (%) | 75 | 75 |
| Salt content in permeating water (ppm) | 120 | 300 |
| Salt rejection rate*² (%) | 92 | 80 |

Note:

*¹Water recovery rate (%) = $\frac{\text{Permeation flow rate}}{\text{Supply flow rate}} \times 100$

*²Salt rejection rate (%) = $\left(1 - \frac{\text{Salt content in permeating liquid}}{\text{Salt content in supply liquid}}\right) \times 100$ As apparent from Table 1, the hollow fiber assembly of the present invention is remarkably superior to the product using the continuous supporting core in respect to the permeation flow rate, pressure loss and effect of salt separation.

EXAMPLE 2

Onto a shaft of 30 mm in diameter, three net-like engaging members having an outer diameter of 35 mm and a length of 300 mm were furnished at a distance of 30 mm from one another. On the same, a cellulose triacetate hollow fiber for reverse osmosis purpose having an outer diameter of 165 microns and an inner diameter of 70 microns was wound in a fixed number of winds while being traversed from one end to the other at the rate of the packing density of 53 and the winding angle of 8° to 30° to form a cylindrical layer of hollow fiber having an outer diameter of 193 mm and a length of 1260 mm. The surface of the hollow fiber layer was covered with a flow screen. Thereafter, only the shaft was removed to make the central part hollow. Into the two ends of the formed hollow fiber layer, epoxy resin was injected to the positions distant by 30 mm from the positions of the engaging members. They were formed by curing to make the resin walls (A) and (B). Between the two resin walls (A) and (B), three elastic supporting members of 7 mm in width and 3.5 mm in thickness (FRP rods) were fitted in parallel with the axis of the cylindrical body. One (A) of the resin walls was cut to have the hollow fiber layer opened to make a hollow fiber assembly.

The thus produced hollow fiber assembly was set into the membrane separation apparatus. By the use of the 1500 ppm NaCl aqueous solution, a reverse osmotic test was carried out under the conditions of 25° C., 30 kg/cm² G and 30% recovery rate. There were also carried out a water permeation test with the outlet of the concentrated water open (shrinkage was evaluated correlated with flow resistance of the hollow fiber layer by passing water only without exerting pressure) and a compression test by application of an external load (shrinkage was evaluated by exerting a load between the resin walls without passing water). The results are as shown in Table 2.

Comparative Example 2

By using a net-like supporting core of 35 mm in an outer diameter instead of the engaging member of Example 2 and without fitting a FRP rod as used in Example 2, a hollow fiber assembly was prepared in the same manner as shown in Example 2. The thus produced assembly was incorporated into the membrane separation apparatus as shown in FIG. 2 to carry out a test under the same conditions as in Example 2. The results are shown in Table 2.

TABLE 2

| | Example 2 | Comparative Example 2 |
|---|---|---|
| Supply flow rate (m³/day) | 220 | 220 |
| Permeation flow rate (m³/day) | 67 | 67 |
| Water recovery (%) | 30 | 30 |
| Salt content in permeating water (ppm) | 75 | 105 |
| Salt rejection rate (%) | 95 | 93 |
| Shrinkage of assembly (mm) | 2 | 8 |
| Shrinkage of assembly in water permeation test shrinkage (mm)/amount of water passed (m³/day) | 0.010 | 0.035 |
| Shrinkage of assembly in compression test shrinkage (mm)/load (kg) | 0.03 | 0.12 |

As apparent from Table 2, the hollow fiber assembly of the present invention is excellent in salt separating efficiency. It shows small amount of shrinkage in passing water. In Comparative Example 2, due to the large shrinkage of the assembly, a long supply conduit 8 as in FIG. 2 must be used to prevent its separation from the end plate 11, thus requiring the use of a long vessel 9. As a result, the volume efficiency (amount of water permeation per volume of vessel) was lower in actual application than in Example 2. Also, when the reverse osmosis operation of Comparative Example 2 was intermittently repeated, the supporting core repeatedly sustained a compression deformation of 8 mm to form permanent stress, by which the separation efficiency showed further decrease.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A hollow fiber assembly having selective permeability consisting essentially of in combination a cylindrical arrangement of multilayers of a plurality of spirally wound flattened, tape-form hollow fibers having selective permeability, said layers of fibers being crisscrossed in a parallel relationship one to the other, at least two core sections centrally located within said cylindrical arrangement of said multilayers of hollow fibers, each of said core sections comprising an engaging member defining a hollow portion, each respective core section being separated and spaced one from the other, a first fluid-tight resin wall disposed at a first end of said assembly in which said hollow fibers terminate such that said hollow fibers open to the exterior of said resin wall, said first resin wall being separated and spaced from said engaging members, a second resin wall disposed at and fixing together a second end of said assembly, said cylindrical arrangement of hollow fibers extending continuously between said first resin wall and said second resin wall, an elastic support means for controlling the distance between said first and second resin walls and a fluid supply conduit means for introducing a fluid to be treated into said hollow fiber assembly.

2. The assembly according to claim 1, wherein said engaging members are disposed at a distance of 1 to 3 cm. from one another.

3. The assembly according to claim 1, wherein said first resin wall is disposed at a distance of 1 to 5 cm. from the nearest engaging member.

4. The assembly according to claim 1, wherein said engaging members are covered with a net-like clothing.

5. The assembly according to claim 1, wherein said elastic supporting means includes elastic supporting members, having a sectional area, connecting said first resin wall with said second resin wall, the elastic modulus, E, of said elastic supporting members, the total sectional area, S, of the elastic supporting members, and the flow rate, Q, of the fluid to be supplied are in the relationship of the formula:

$$(E \times S/Q) \geq 40$$

wherein $E = Kg/cm^2$, $S = cm^2$ and $Q = liter/minute$.

6. A membrane separation apparatus comprising at least two hollow fiber assemblies as described in claim 1.

* * * * *